United States Patent
Arunachalam et al.

(10) Patent No.: US 6,631,122 B1
(45) Date of Patent: Oct. 7, 2003

(54) METHOD AND SYSTEM FOR WIRELESS QOS AGENT FOR ALL-IP NETWORK

(75) Inventors: Vaidhyanathan Arunachalam, Plano, TX (US); Kalyan Basu, Plano, TX (US); Sanjoy K. Sen, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/330,915

(22) Filed: Jun. 11, 1999

(51) Int. Cl.⁷ .................................................. H04Q 7/00
(52) U.S. Cl. .................................... 370/332; 370/236.1
(58) Field of Search .................................. 370/233, 293, 370/277, 310.1, 310.2, 352, 338, 354, 355, 306, 401, 465, 466; 455/3.01, 3.05, 3.06; 709/202

(56) References Cited

U.S. PATENT DOCUMENTS

| | | | | |
|---|---|---|---|---|
| 5,995,539 A | * | 11/1999 | Miller | |
| 6,131,012 A | * | 10/2000 | Struhsaker | |
| 6,144,645 A | * | 11/2000 | Struhsaker | |
| 6,154,776 A | * | 11/2000 | Martin | |
| 6,160,804 A | * | 12/2000 | Ahmed | |
| 6,262,982 B1 | * | 7/2001 | Donahue | |
| 6,295,285 B1 | * | 9/2001 | Whitehead | |
| 6,377,573 B1 | * | 4/2002 | Shaffer | |
| 6,385,195 B2 | * | 5/2002 | Sicher | |
| 6,404,738 B1 | * | 6/2002 | Reininger | |

FOREIGN PATENT DOCUMENTS

| | | |
|---|---|---|
| EP | 0768806 | 4/1997 |
| WO | WO 97/36405 | 10/1997 |

OTHER PUBLICATIONS

Figueira, N.R., et al., "Remote–Queueing Multiple Access (RQMA): Providing Quality of Service for Wireless Communications", Infocom '98, 17th Annual Joint Conference of the IEEE Computer and Communications Societies, IEEE San Francisco, CA USA Mar. 29–Apr. 2, 1998, pp. 307–314.

Das, S.K. et al., "A Resource Reservation mechanism for Mobile Nodes in the Internet", Vehicular Technology Conference, 1999, IEEE 49th Houston, Texas, May 16–20, 1999, Piscataway, NJ, IEEE May 16, 1999, pp. 1940–1944.

Mikkonen, J., et al., "An Integrated QoS Architecture for GSM Networks", Universal Personal Communications, ICUPC '98, IEEE 1998, Int'l Conference on Florence, Italy, Oct. 5–9, 1998, New York, NY, IEEE, Oct. 5, 1998, pp. 403–407.

* cited by examiner

Primary Examiner—Kwang Bin Yao
Assistant Examiner—Kamran Emdadi
(74) Attorney, Agent, or Firm—John D. Crane; Bracewell & Patterson, L.L.P.

(57) ABSTRACT

A wireless quality of service (QoS) agent for an all-Internet Protocol (IP) network. The QoS agent couples to an all-IP network. The coupling means includes communication means for transfer of information between the agent and a QoS manager of the all-IP network. The agent is also able to seamlessly extend QoS support for multimedia applications from wireline to wireless and control QoS of the multimedia applications sent over wireless connections on the all-IP network.

12 Claims, 11 Drawing Sheets

METHOD AND SYSTEM FOR WIRELESS QOS AGENT FOR ALL-IP NETWORK

BACKGROUND OF THE INVENTION

1. Technical Field

The present invention relates in general to an improved performance of a wireless access in Internet Protocol (IP) network, and in particular to a method and system to manage the end-to-end QoS on an IP network utilizing wireless access. Still more particularly, the present invention relates to a method and system to provide a wireless QoS agent for an all-IP network.

2. Description of the Related Art

Wireless access is expected to be one of the key access technologies for providing IP services to the user, end-to-end seamlessly. The-wireless network works as the access subnet of the IP network, has its own unique set of complex characteristics. To improve the behavior of the wireless link's susceptiblely to frequent error bursts (due to fading, shadowing etc.), the usage of various low layer (physical/link) techniques such as Forward Error Correction (FEC) coding, interleaving, dynamic channel allocation, power control, link layer Automatic Request for Retransmission (ARQ) mechanisms, etc. becomes necessary to provide the required end-to-end performance to the user over an all-IP network.

Traditional Internet is based on a stateless switching fabric and supports only "best effort" packet data services. With the proliferation of multimedia services via the Internet-video-conferencing, tele-medicine, telephony, video-on-demand etc., there is an increasing demand to support guaranteed Quality-of-Service (QoS) over the Internet. In IP based networks, the performance is characterized by the speed and fidelity of the data transferred from source to destination. The term for characterizing a performance of an IP packet flow is "Quality of Service" (QoS) and is measured by packet transfer delay, jitter, probability of packet loss and throughput. There are two other forms utilized to define the performance of a system, namely, grade of service (GOS) and availability and reliability. Under the "IP QoS" umbrella, two solutions work towards the development of a framework to support QoS in IP best-effort networks. Work of the Integrated Services (Int-Serv) working group led to the development of the Integrated Services Architecture and the RSVP signaling protocol. RSVP promises per-flow QoS through resource reservation and maintenance of "soft state" in all intermediate routers. Int-Serv has limitations on four major areas namely (a) scalability, (b) overhead is too large, (c) this is a connection-oriented approach and, (d) most of the Host to Host connections do not address the intermediate management point issues. To overcome these limitations, the Differentiated Services (Diff-Serv) architecture was proposed. The Diff-Serv architecture aims to provide scalable service discrimination and "better than best effort" service in the Internet without the need of per-flow state maintenance at every router.

Over the last few years, there has been an explosive growth of wireless communication technology. Voice communication over wireless links utilizing cellular phones has matured and alongside portable computing devices such as notebook computers and personal digital assistants (PDAs) have emerged resulting in such applications as electronic mail and calendar/diary programs being provided to mobile or roving users. Observing this trend, it can be predicted that the next generation traffic in wireless networks will be mostly generated by personal multimedia applications including fax, video-on-demand, news-on-demand, World Wide Web (WWW) browsing, and traveler information services.

The current circuit switched based wireless networking is not efficient and cost effective. Moreover, in the current solution, overlay data network is needed to support data services and multimedia service implementation is complex. As the communications market is being driven by the demand for sustained connectivity to the Internet, it has become attractive to merge the wireless network with the Internet. The ability to provide seamless roaming and cost-effective connectivity to the network from anywhere and anytime will be an extra value from the network operators. Data services will seek to achieve an optimal combination of wide area network mobility and various types of multimedia service guarantees, making use of the already existing Internet infrastructure.

Wireline networks seldom lose packets due to link failure, which is generally caused by node congestion because of excess traffic. Hence, if suitable flow control and traffic shaping is applied at the edge of the network, the loss behavior can be controlled. The same premise applies for controlling delay and jitter within the network. The wireless link, on the other hand, demonstrates totally unpredictable behavior (fading, shadowing etc.) largely due to the mobility of the users, the terrain conditions, and multipath effects, etc. The reliability of the CDMA wireless link is also heavily dependent on the other-user interference which is a random function of the number and spatial co-location of the users.

Notwithstanding the hostile nature of the radio link and limited QoS provisioning-within the Internet, the next generation wireless networks aim at providing the end user with a multitude of services comparable in quality to their wireline counterpart. Present QoS provisioning techniques within the Internet are not enough for quality assurance in the wireless subnet, primarily because of the unpredictable nature of the radio link. QoS management for wireless links will involve coordination among many different lower layer techniques which may require frequent link adaptability and dynamic adjustments, necessitating a control agent.

Therefore, a need exists for a wireless QoS agent/manager responsible for mapping multimedia IP QoS requirements to radio link specific requirements, providing dynamic link adaptability and resource allocation capabilities, low layer flow control, air link QoS monitoring, and providing seamless extension of IP QoS to the mobile user. The present invention solves this problem in a new and unique manner that has not been part of the art previously.

SUMMARY OF THE INVENTION

It is therefore one object of the present invention to provide an improved performance of a wireless access in IP network.

It is another object of the present invention to provide a mechanism to manage the end-to-end QoS on an IP network utilizing wireless access.

It is another object of the present invention to provide a wireless QoS agent for an all-IP network.

The foregoing objects are achieved as is now described. A wireless quality of service (QoS) agent for an all-Internet Protocol (IP) network is disclosed. The QoS agent couples to an all-IP network. The coupling means includes communication means for transfer of information between the agent and a QoS manager of the all-IP network. The agent is also able to seamlessly extend QoS support for multimedia applications from wireline to wireless and control QoS of the multimedia applications sent over wireless connections on the all-IP network.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
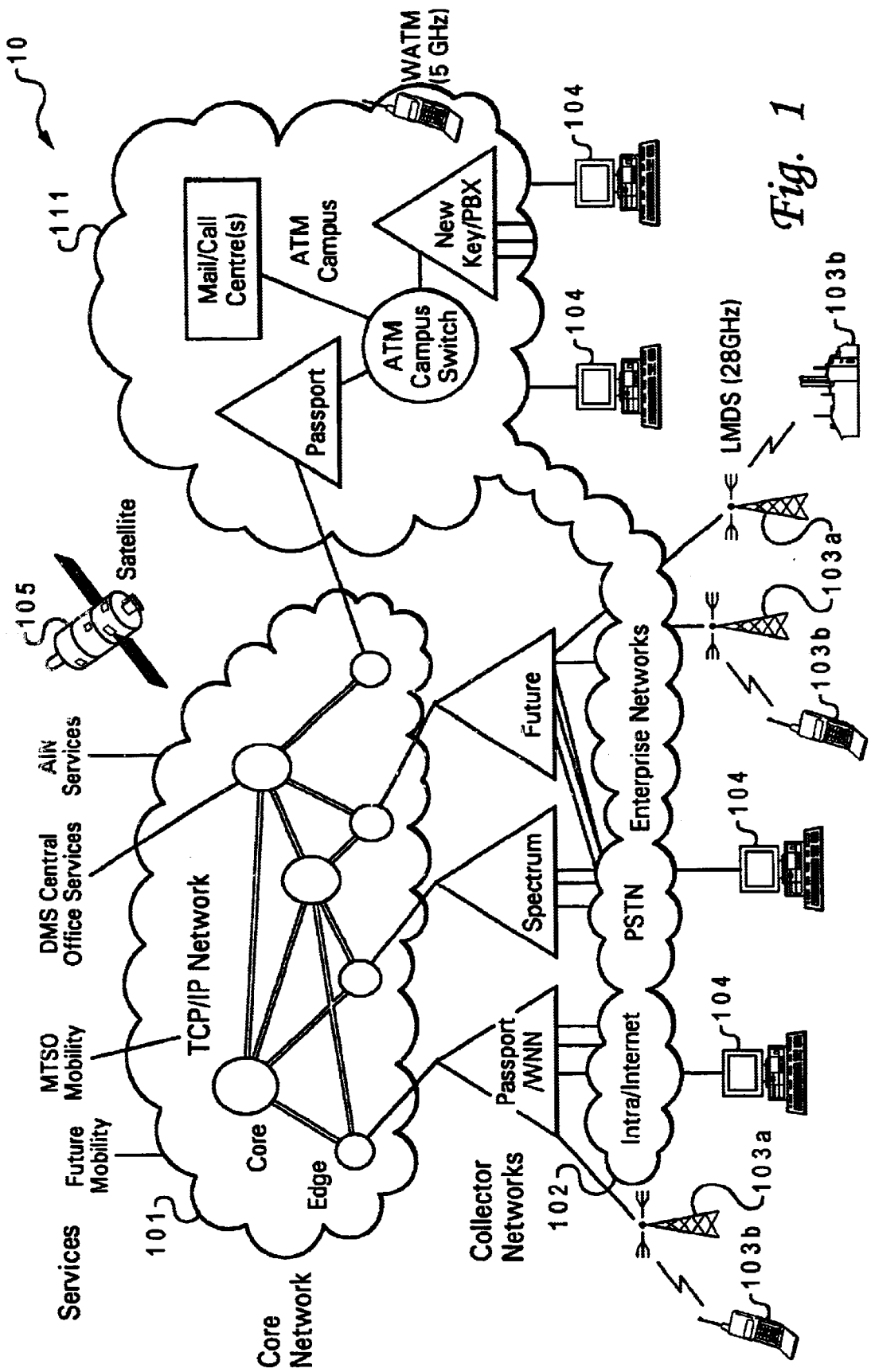
FIG. 1 is an illustrative block diagram of a next generation wireless network which may be adapted for use in accordance with the present invention.

The present invention implements a framework for a QoS agent for a next generation wireless access network. Seamless connectivity to all-IP networks requires that this concept be easily integrable with existing QoS paradigms. Turning now to the figures, FIG. 1 depicts a block diagram of one example of a next generation wireless network 10 in accordance with the present invention. FIG. 1 consists primarily of core network 101 and collector network 102. Core network 101 is an IP network with its various service points and interconnections. Core network 101 is connected to collector networks 102 which consists of a host of various types of services including asynchronous transfer mode (ATM) services 111. Connected to collector networks are wireline end terminals 104 and wireless end terminals 103b which receive their signalling from transmitters 103a. Also depicted in FIG. 1 is a satellite 105 utilized also in wireless transmission of signals.

Figure 2:
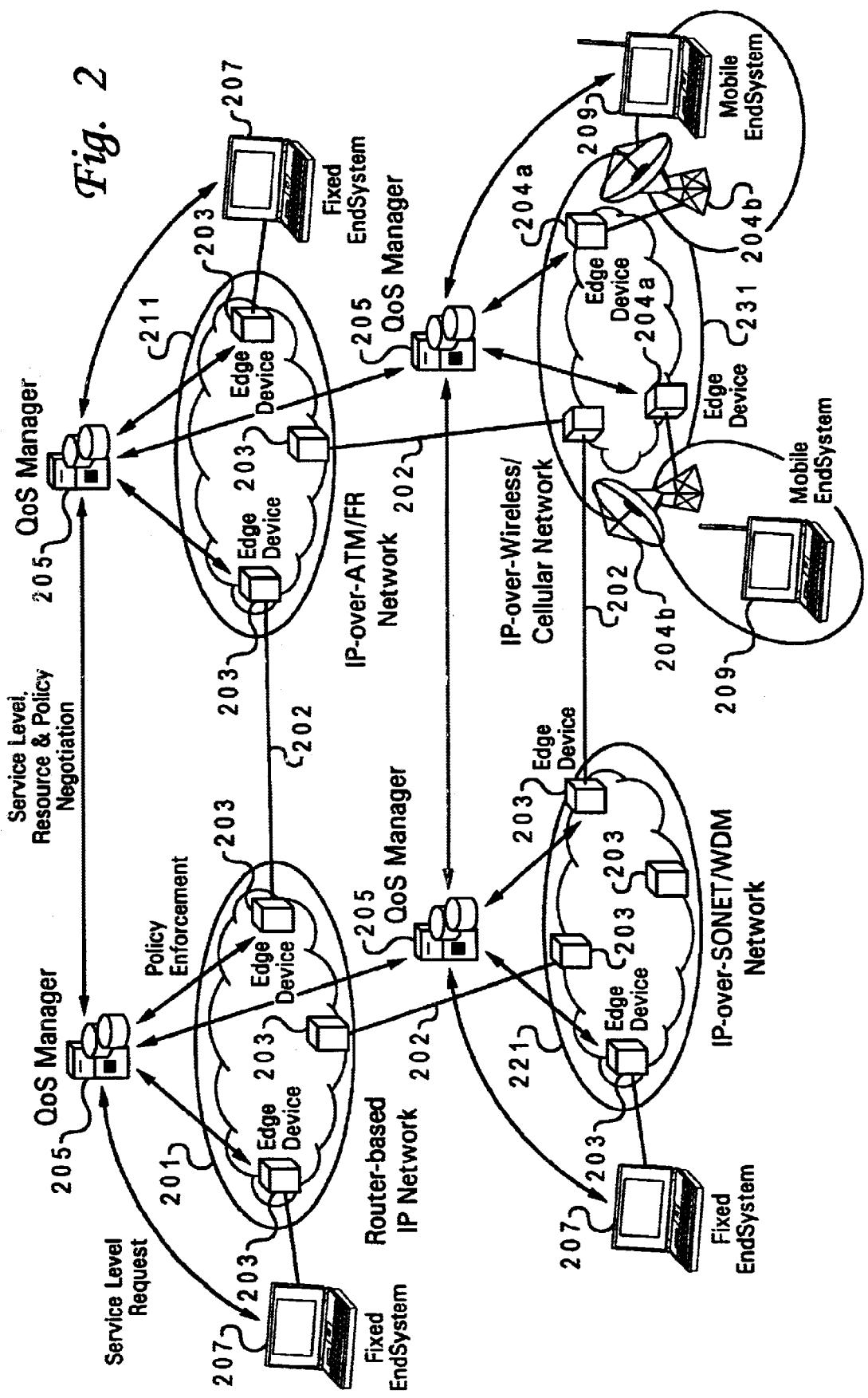
FIG. 2 is an illustrative block diagram of a QoS agent based IP QoS architecture in accordance with the present invention.

Referring to FIG. 2, there is illustrated an IP QoS architecture with a QoS Agent in accordance with the present invention. A QoS manager 205 is connected to its respective IP service. Four distinct access networked are illustrated in FIG. 2. These include Router-based IP network 201, IP-over-ATM/FR network 211, IP-over-SONET/WDM network 221, and IP-over-wireless/Cellular network 231. The present invention deals primarily with the last type of access network listed, but is not limited to such applications. Each network, contains a plurality of edge devices which provide connections to endsystems. The first three networks are wireline networks with edge device 203 connected to fixed endsystems 207. IP-over-wireless/cellular network 231 consists of edge device 204a coupled to wireless transmitters 204b. Signals are transmitted to mobile endsystems 209.

The IP Qos manager is itself part of the Diff-Serv architecture. Those skilled in the art are familiar with the Diff-Serv architecture and its various functionalities which may be utilized within the present invention. This architecture will be capable of providing consistent service delivery across heterogeneous IP networks consisting of multivendor devices, disparate link layer technologies, as well as different administrative domains. The QoS Agent provides the following capabilities of Diff-Serv's bandwidth broker: Intra-domain as well as inter-domain service level negotiation; per-domain admission control, resource reservation; and per-domain flow marking policy management and enforcement. Additionally, it is capable of a number of services including: mapping IP flows to lower (Layer 2/1) layer flows; enforcing flow (re) routing policies for fault handling and load balancing, etc., and providing some value added services like real-time accounting, advanced service level negotiation and brokering.

Figure 3:
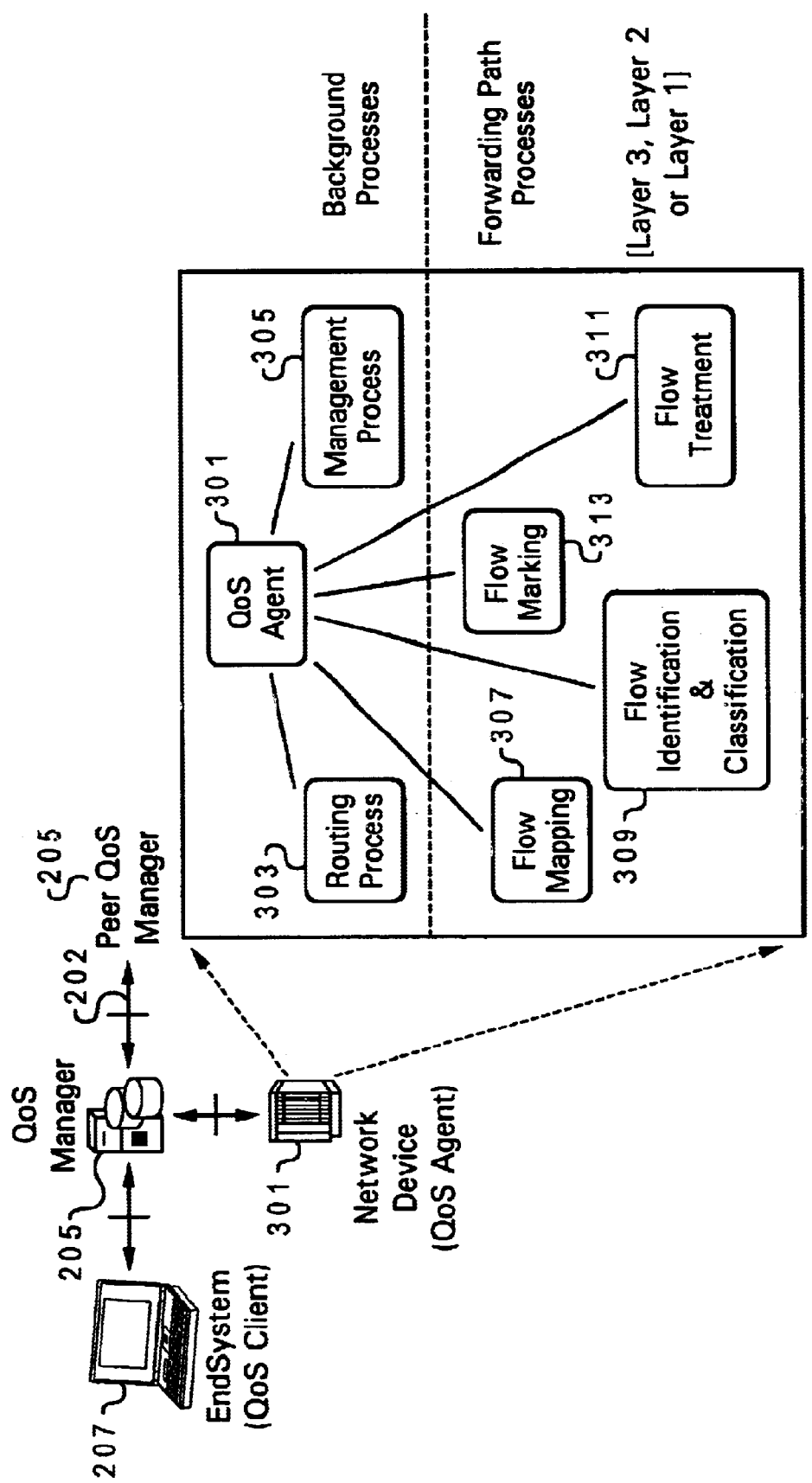
FIG. 3 is an illustrative block diagram of the functional processes of the wireless QoS agent in accordance with the present invention.

According to the preferred embodiment of the present invention, the architecture also defines a QoS agent within the wireless access network which is a slave device to the IP QoS agent. The agent configures and enforces policies within the network devices's flow handling mechanism under the QoS agent's instructions. The primary function of the agent is enforcing flow classification, marking, mapping & treatment policies. FIG. 3 illustrates the various functional processes of the QoS agent. Wireless Qos agent 301 is interlinked with IP Qos manager 205 which as described in FIG. 2 is interconnected with other peer IP QoS agents via some busses 202 and endsystems 207. For illustration purposes, QoS agent is depicted as separate functional block from QoS agent. The present invention contemplates an embodiment where the two blocks are merged. Wireless QoS agent and wireless QoS manager are utilized interchangeable for the remainder of the document. The present invention specifically targets wireless/mobile endsystems 209. Wireless QoS agent 301 when implemented provides background processes and forward path processes. Forward path processes occur on layer, 1, layer 2 or layer 3 of the signalling protocol. Background processes include routing process 303, and management process 305. Forward path processes include flow mapping 307, flow marking 313, flow identification and classification 309, and flow treatment 311.

In accordance with the teachings of the present invention, the QoS Manager/Agent provides additional guarantee to the QoS parameters, namely, delay, jitter, bandwidth and reliability, pertaining to user applications. The complexity of wireless link management centers around providing the flexibility of selecting various QoS provisioning techniques for next generation wireless systems and the future broadband wireless systems. A QoS agent is advantageous in guiding the Radio Resource Manager (RRM) in allocating radio channels (meeting particular coding, interleaving requirements) and software blocks for link layer Automatic Request for Retransmission (ARQ), and power control algorithms, etc. Also, the QoS agent will be able to help some of these algorithms to perform link adaptation depending on the current quality of the radio link and service applications, by fine-tuning certain changeable parameters (e.g., power control step size, number of retransmissions in ARQ etc). The traditional RRM performs dynamic channel (re)allocation when instructed by the QoS agent, for example, to move a user from a ½ code-rate channel to ¼ code-rate, during a period of frequent error burst. All the above functions will be governed by three types of radio resource usage policies by the wireless QoS Agent: (1) SLA policies, (2) tariff policies, and (3) fairness policies.

Figure 4:
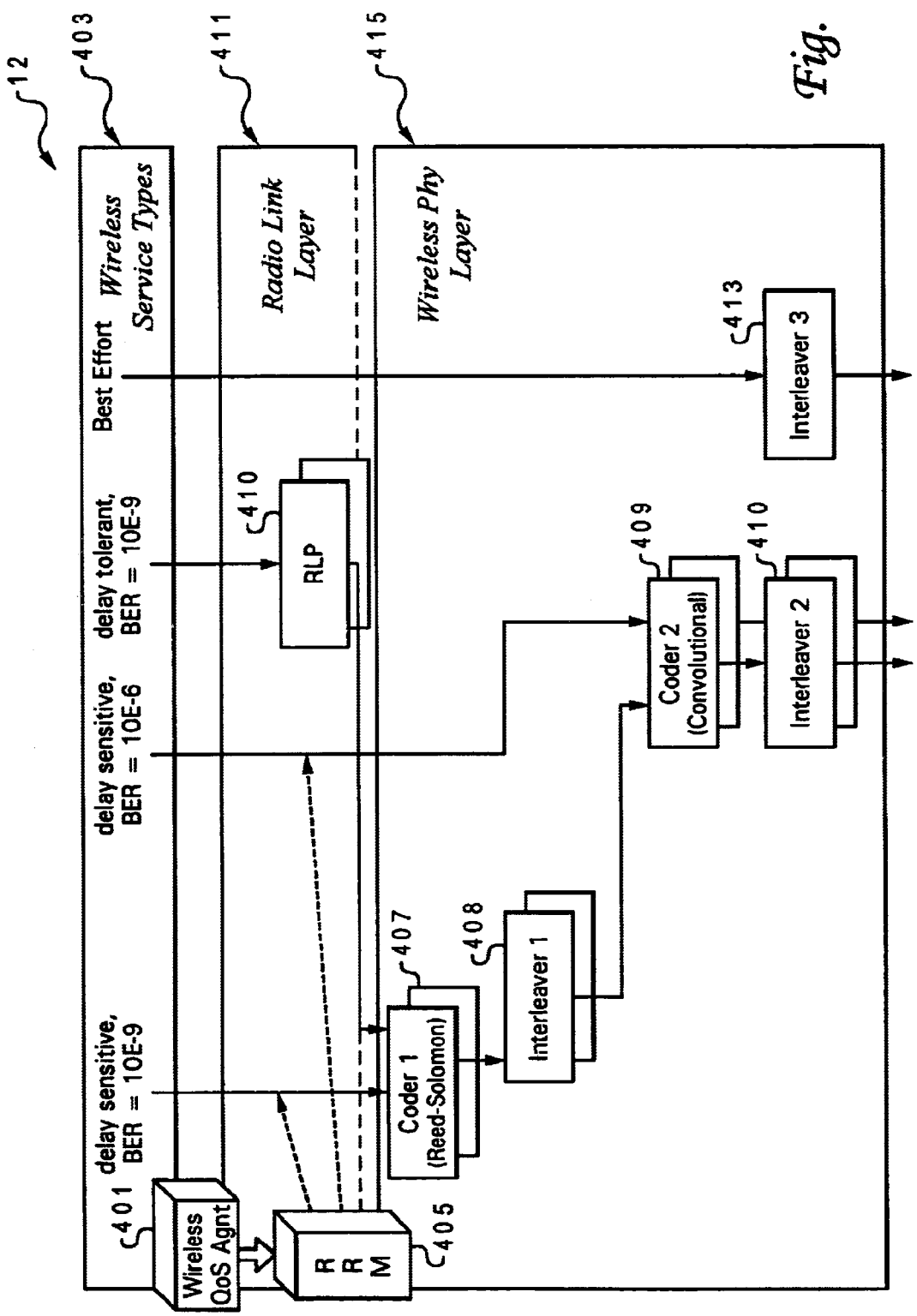
FIG. 4 is an illustrative block diagram of an example of wireless QoS provisioning in accordance with the present invention.

The base station subsystem of a third generation radio system provides these different types of radio channels (each providing different levels of QoS) and switches traffic to these channels. FIG. 4 depicts an example of a wireless QoS provisioning. The example shown in FIG. 4 envisions QoS provisioning utilizing various types of radio channels in the base station subsystem of the next generation wireless networks. Three layers are defined illustrating wireless service types 403, radio link layer 411, and wireless physical layer 415. Various classes of wireless services with specific QoS requirements are allocated radio link layer 411 resources (e.g., RPL 410) and radio channels RRM 405, to meet their service requirements, under the control of the wireless QoS agent 401. Different coder types are utilized based on the wireless service types 403. These include coder 1 407 and coder 2 409 and their corresponding interleaver 1 408 and interleaver 2 410. Interleaver 3 413 is also depicted and utilized when best effort service type is desired. Additional versions of this design may also be implemented.

Figure 5:
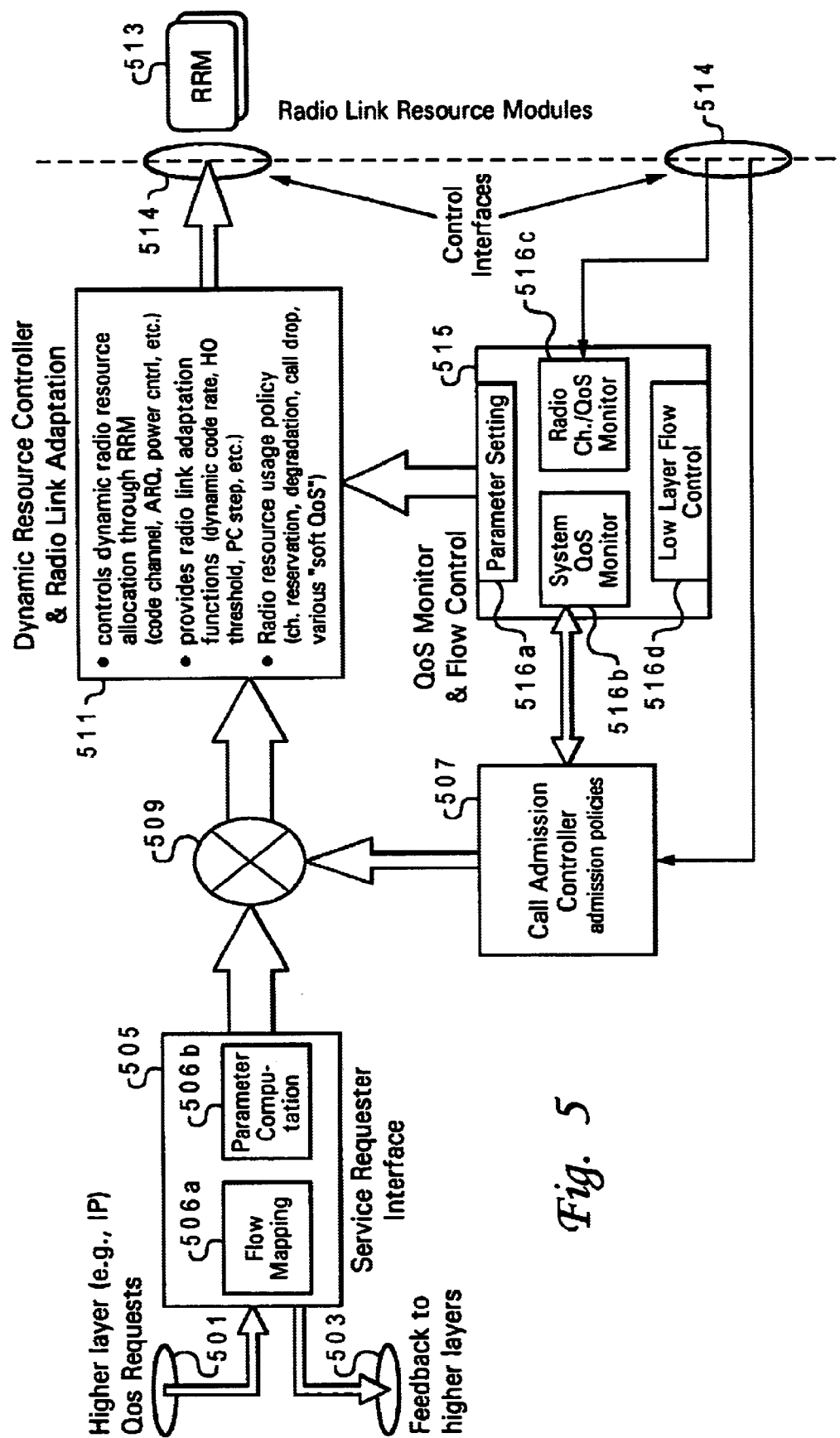
FIG. 5 an illustrative block diagram of the internal functional components of a wireless QoS agent in accordance with the present invention.

The wireless QoS agent will be built upon the IP QoS agent structure and will enhance it to include most of the radio link dependent functionalities as discussed below. FIG. 5 explores the functionalities of the QoS agent in more detail and provide a glimpse of its internal structure. A service requester interface 505 consisting of flow mapping 506a and parameter computation 506b blocks receives higher layer QOS requests 501. It provides feedback to higher layers 503, but more importantly, a call admission controller 507 makes a call admission decision based on the parameters computation (resource estimation). If admitted, the request goes to a Dynamic Resource Controller (DRC) and Radio Link Adaptation block (RLA) 511. DRC and RLA also receive an output from QoS monitor and flow control block 515 which contains parameter setting 516a, system QoS monitor 516b, radio channel QoS monitor 516c, and low layer flow control 516d. An interconnection is provided to RRM radio link resource modules 513 via control interfaces 514.

A possible way to implement service mapping and dynamic QoS adaptation is over-the-air interface between the mobile and the base station. However, to achieve certain grade of service, QoS requirements should be met over the entire network between the source and the destination. This requires QoS negotiation between the third generation wireless network and the end user and possibly between the third generation network and the wireline network, as packets traverse through the network. The framework of the present invention allows for (a) negotiation of Service Level Agreement (SLA) between the wireless network and the wireline network, and (b) dynamic re-allocation of resources when there is a QoS degradation (as decided by the Frame Error Rate (FER) or some other criteria).

QoS is specified in an IP packet in a Diff-serv network by marking a certain byte referred to as the Type-of-Service and Digital Signal (ToS/DS) byte. In the proposed framework, an IP packet from the base station to the mobile with a specified QoS is routed to a suitable LAC/MAC resource and physical channel resource so that its QoS requirements are met. This is achieved through the use of a unique identifier for each flow, referred to as the Logical Flow Identifier (LFI). Likewise, an incoming IP packet from the mobile to the base station is assigned a QoS based on negotiations between the third generation wireless network and the user (and also, possibly the transit network).

QoS parameters like delay, jitter, Bit Error Rate (BER), throughput etc are dictated by the application requirements. QoS can be provisioned on a per-flow basis through mechanisms such as Resource Reservation Protocol (RSVP), as the flow traverses the network. Another approach is to aggregate flows into service classes and associated certain expected QoS behavior with those classes. This approach is followed by the Diff-Serv working group in IETF. Under the Diff-Serv framework, each Internet Service Provider (ISP) domain can provide its customers with various service classes and charge for them accordingly. A similar paradigm is expected to be followed by a third generation wireless network operator implementing the cdma2000 standard. The third generation wireless network is expected to interwork with various types of transit networks each with its own definition of service classes.

It is appropriate to split the QoS processing function into the following sub-functions:

1. QoS mapping: There are two kinds of QoS mapping namely (a) mapping customer requirements directly to a service class at either the transit network or at the third generation wireless network and (b) mapping to/from the service class of the transit network from/to service class of the third generation wireless network. QoS mapping is a policy decision and may involve service level agreements (SLA) between the two network operators or between the third generation network operator and the customer; and 2. QoS implementation: QoS implementation is the provisioning of QoS associated with a particular service class: It involves (a) protocol layer resources, RLP/RBP, channel coding, power control etc., currently being developed as part of the third generation architecture in software and hardware, (b) routing of the packet traffic belonging to a particular service class to the actual mechanisms associated with it, and (c) multiplexing/demultiplexing among various users sharing the same mechanism, by utilizing some scheduling techniques.

The separation between the QoS mapping and QoS implementation functions permits the ability to change the underlying QoS provisioning mechanisms (the terms "mechanisms" and "resource" are used interchangeably within the document) without changing the service class definition which will be dictated by the standard. It is also easier to add new service classes in the future. Also, when a new network is connected to the third generation network (e.g., a new ISP with its own set of new service classes), it is easier to map these service to the existing set of third generation service classes, rather than to map them directly to LAC/MAC and physical layer resources. Finally, the separation of the routing functions permits flexible service adaptation during session, as will be described below.

An example of possible end-to-end QoS provisioning framework conforming to the ideas of the current Diff-serv WG in Internet Engineering Task Force (IETF) is now presented. In this example, the third generation access network is interworking with an IP Diff-Serv transit network which is connected to a private Intranet through a firewall. Any semblance of end-to-end QoS is provided through Service Level Agreements (SLA) between the networks. The Wireless QoS Management shown in the Figure is a functional entity that has two parts in it: (i) the radio access QoS management part which will reside in the BSC or Wireless Access Node (WAN), and (ii) the core interworking QoS management part which will interact with the Wireless Gateway (WGW).

Figure 6:
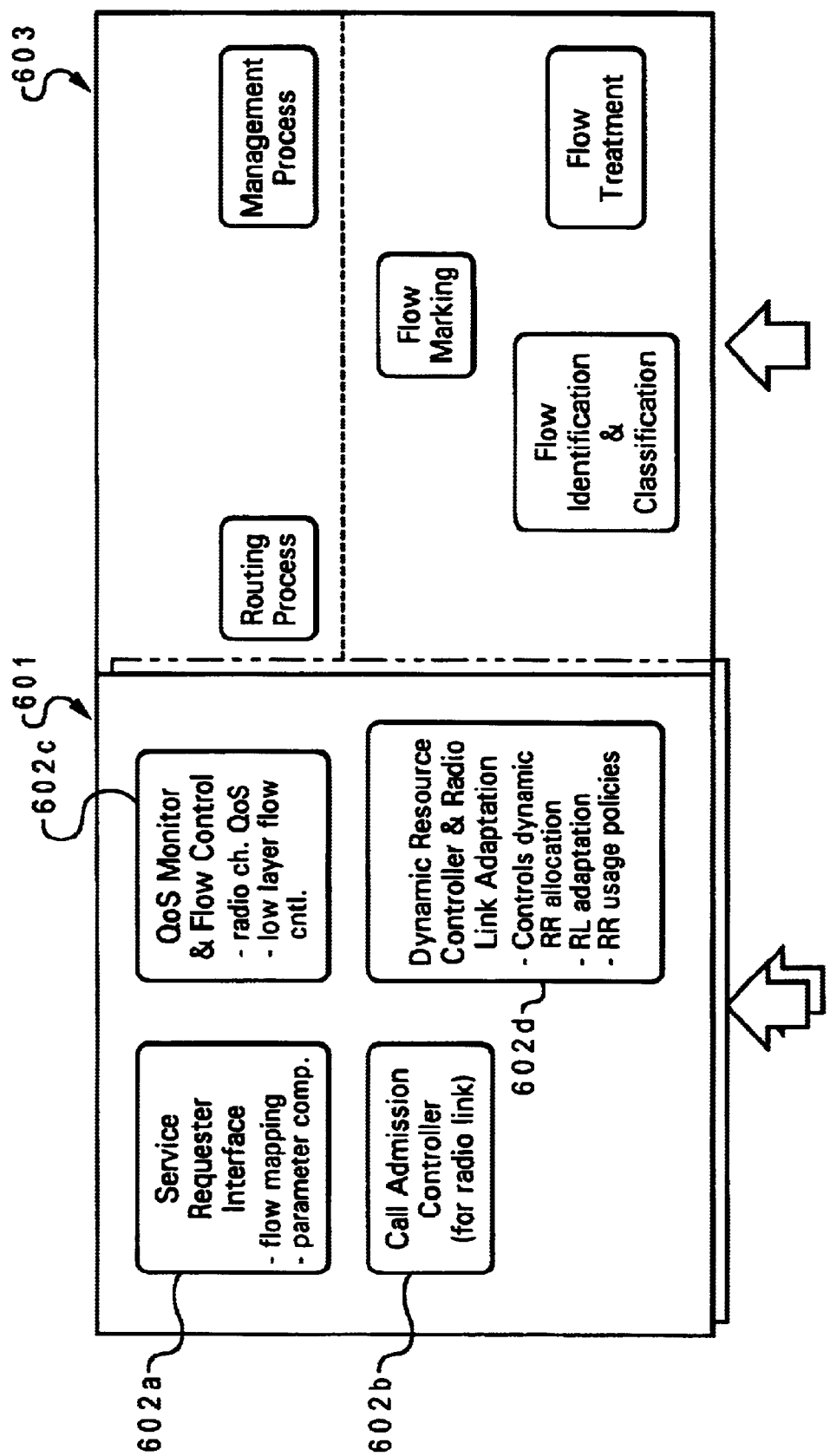
FIG. 6 is an illustrative block diagram of enhancements required to create the IP QoS agent.

FIG. 6 depicts the enhancements required to the current IP QoS agent structure to implement the wireless QoS agent. The existing IP Qos Agent structure 603 has been previously described in FIG. 3. The enhancements to the QoS agent structure for wireless domain 601 includes a service requester interface 602a, a QoS monitor and flow control 602c, a call admission controller (for radio link) 602b and a dynamic resource controller and radio link adaptation 602d. Note that all of the above-mentioned function blocks need to be created in order to satisfy the requirements of wireless QoS agent. The wireless QoS agent will also be able to serve as an autonomous body (not as part of the IP QoS architecture) to provide QoS guarantee locally within the wireless subnet. The service requester interface block will map QoS requests from individual users to the wireless multimedia services so that the other functional blocks of the wireless QoS agent can be reused.

Turning now to the actual framework of a QoS agent for wireless QoS IP network according to the invention, two basic link processes are involved in wireless communication which require the QoS agent and framework of the invention. These link processes are the downlink and uplink of packets.

Figure 7:
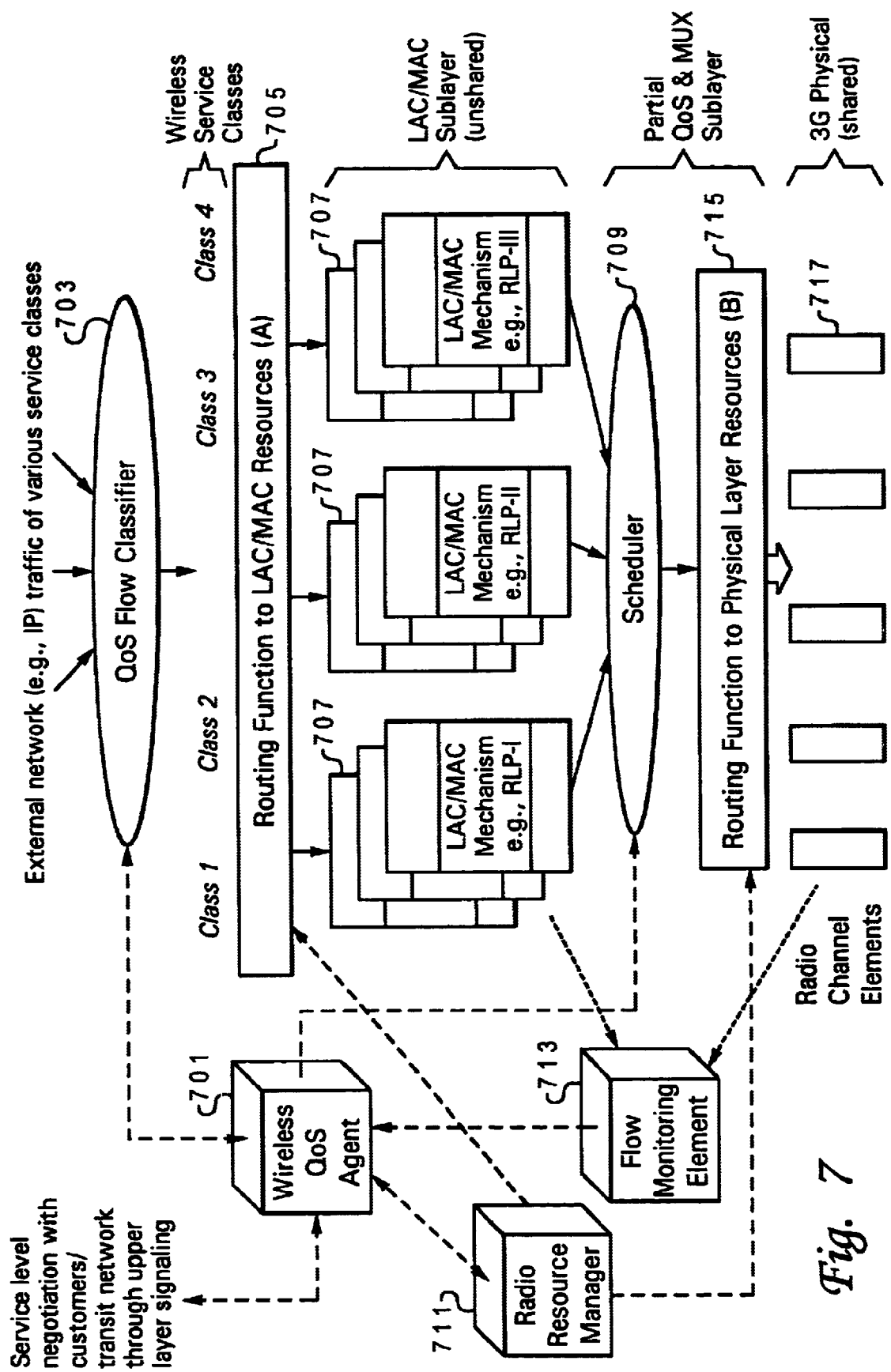
FIG. 7 depicts a third generation QoS framework for a base station in accordance with the present invention.
Figure 8:
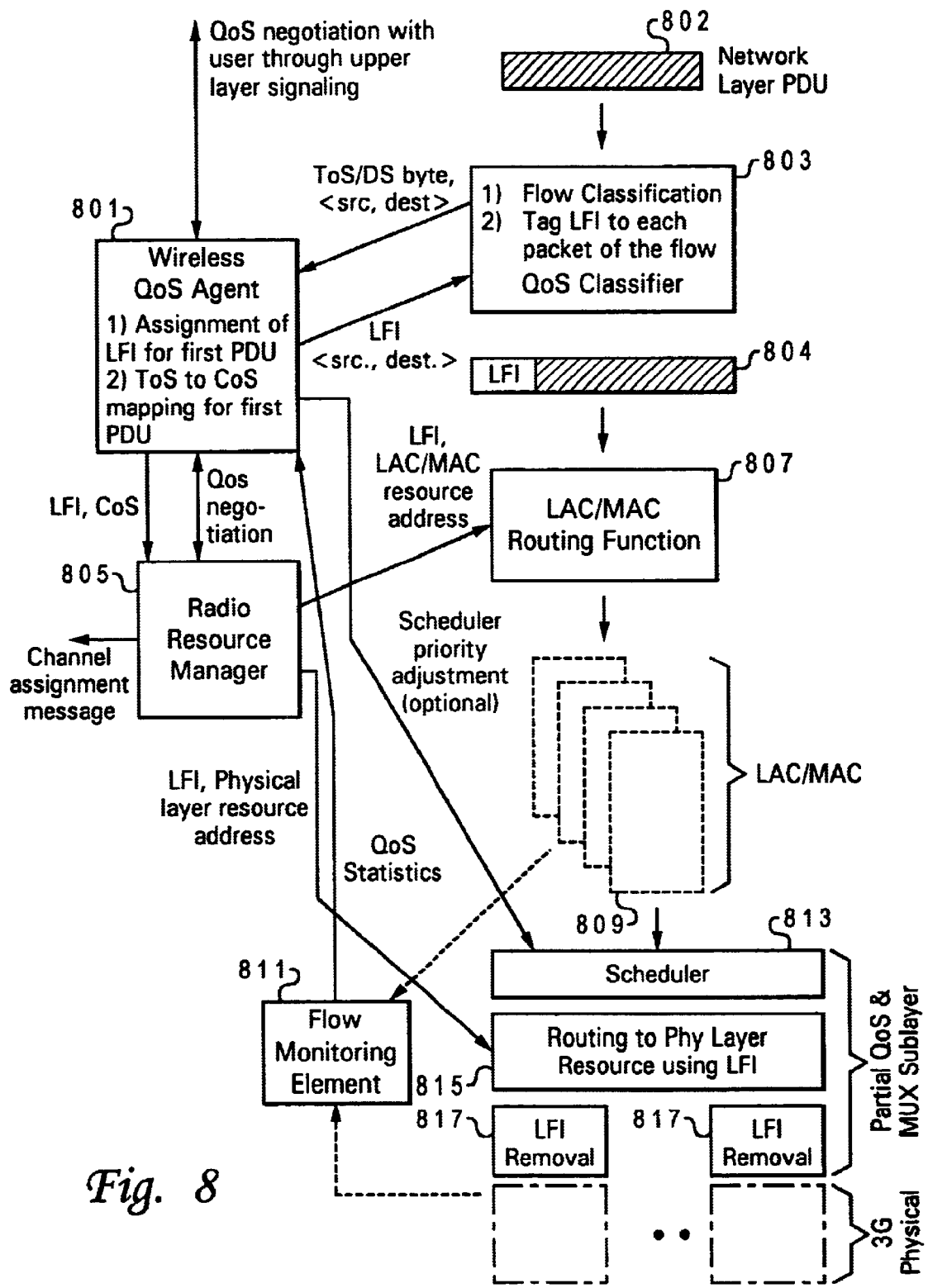
FIG. 8 depicts the message flow between the various sub-component entities in accordance with the present invention.

A. QoS Framework Operation for Downlink Packets:

FIG. 7 is a block diagram of the QoS framework within the wireless network. The blocks include QoS flow classifier 703, wireless QoS agent 701, radio resource manager 711, routing function for LAC/MAC layer 705, routing function for physical layer resources, scheduler 709, and flow monitoring element 713. Also included in FIG. 7 are a plurality of LAC/MAC mechanisms 707 and radio channel elements 717. Each block exists within a particular sub-layer of the protocol. The bold and the dashed arrows respectively indicate traffic flow and the interactions between the blocks. A description of the functions of each block is provided within a description of FIG. 8. FIG. 8 is presented in the context of an incoming IP packet from the upper layer with the ToS/DS byte set according to its service class. It is assumed here that the IP packets are coming from a Diff-serv base transit network, with the DS byte set according to the class of service for the packet. This describes the message flow for downlink IP packets.

When an IP packet 802 arrives from the wireline network to the wireless network, the upper layer (layer 3 and above) packet traverses third generation LAC/MAC layer 807 before being transmitted over the air link. QOS mapping function 803 performs a number of different functions described below.

For the first packet of a new flow, QoS mapping function 803 extracts the ToS (or DS) byte of the IP header and the <source address/port, destination address/ports>field. The ToS/DS byte indicates the QoS desired by the IP packet. The <source address/port, destination address/port> determines the flow identifier (Id). QoS mapping function 803 sends the ToS/DS byte and the <source address/port, destination address/port> to the wireless QoS agent 801.

The wireless QoS agent 801 examines the ToS/DS byte and map it to the class of services (CoS) permitted in the third generation wireless network (FIG. 7 shows 4 classes of services). This mapping between the DS byte and the wireless CoS is determined solely by the wireless QoS agent 801.

Wireless QoS agent 801 assigns a tag called the logical flow ID (LFI) 804 to the flow. QoS mapping function 803 obtains the LFI from wireless QoS agent 801. 155 For later IP packets 802 of the same flow, QoS mapping function 803 tags the LFI to these packets and sends them to the LAC/MAC routing function.

In the present invention, an LFI serves two primary purposes: (i) it associates a particular service class with a flow; and (ii) it helps in routing the flow to its allocated resource entities. Note that each flow has a unique LFI implying that there is a many-to-one mapping between LFI's and third generation service classes. In the preferred embodiment, wireless QoS agent 801 has a pool of pre-allocated LFI's. In another embodiment, LFIs are randomly generated and wireless QoS agent 801 keeps track of which LFI belongs to what service class. For example, considering four third generation service classes 1, 2, 3 and 4 and a set of randomly generated LFI's 300, 312, 313, 314, 400, 500, 605, and 645, LFI's 300, 312, 314 may be allocated to three flows of class 1, LFI's 400 and 313 to two flows of class 2, LFI 500 to a class 3 flow and LFI's 605 and 645 to two class 4 flows.

Wireless QoS agent 801 is a key component of the QoS framework which allows for service negotiation between QoS agent and the end user. This is achieved by special messages through the signalling channel after the user is authenticated by the system. It is contemplated that the third generation wireless network will have its own set of service classes. The transit network will also have its own set of service classes. For example, an IP Diff-serv transit network may have three classes such as expedited forwarding (EF), assured forwarding (AF) and default best effort. In order to provide service guarantee for incoming or outgoing traffic, there has to be some agreement (generally referred to as the Service Level Agreement (SLA)) about the mapping between the service classes of the two networks. For each transit network that the third generation wireless network connects to, wireless QoS agent 801 in FIG. 8 maintains a mapping table (not shown) between the service classes of the two networks.

In one embodiment, QoS agent is capable of exchanging service level agreements (SLA) with the peer QoS agent in the transit network (such as the Bandwidth Broker proposed by the Diff-serv WG). The SLA will determine the QoS mapping to a specific class of service (CoS) and the flow conditioning requirement as the traffic traverses one network boundary to another.

In the preferred embodiment of the present invention, the wireless QoS agent performs the following functions for IP packets in the downlink direction:

1. It examines the ToS/DS byte sent by the QoS flow classifier and returns an LFI to the QoS flow classifier. The LFI is a tag appended to all packets of the same flow (same <source address/port, destination address/port>) and is utilized in the routing functions;
2. It maps the QoS (as defined by the ToS/DS byte) in the wireline transit network to the CoS permitted within the third generation wireless network;
3. The third generation subscriber may negotiate its QoS requirements (parameters) directly with the wireless QoS agent through upper layer signalling which will be mapped to a wireless service class by the latter, or the user may directly subscribe to a particular wireless service class through higher layer signalling;

4. After the wireless QoS agent resolves the QoS mapping, it sends the LFI and CoS information of the new flow to the Radio Resource Manager;

5. It helps the RRM to make a call admission decision based on its estimation of the QoS targets for the new flow and the QoS (e.g., FER, delay, jitter etc) that can be achieved currently by the system;

6. If a scheduling algorithm is utilized to schedule packets of different flows to the same physical channel (as in case of a shared supplemental channel), the QoS agent determines the weights to be assigned for this scheduling; and 7. It initiates dynamic QoS adaptation based on its own understanding of the service quality received by a flow, or when requested by the user in session.

RRM 805 decides on the LAC/MAC layer 807 and physical layer resources 815 to be allocated to a particular wireless service class. This allocation is a policy decision and depends on the implementation. Different LAC/MAC layer 807 may implement different ARQ techniques (e.g., RLP-I, RLP-II etc.). Physical layer resources 815 also differ depending on coding implementations such as Turbo coding and convolutional coding. These are defined within the invention as a part of the third generation LAC/MAC and physical layer standards. In the present invention, each of these mechanisms are being implemented in hardware or software and each has a unique address. RRM 805 determines the set of resources to be provided to a particular LFI depending on its CoS. Thus, RRM 805 has to make a call admission decision. For this, it queries a Resource Configuration Database (RCD-defined in CDMA2000) (not shown) for the available resource statistics. It also consults with wireless QoS Agent 801 to determine whether the requested QoS can be met. Those skilled in the art are familiar in part with call admission control. Thereafter, RRM 805 conveys the actual physical addresses of the resources allocated for this flow (LFI) to both the LAC/MAC layer 807 and physical layer resources 815. Although the details of the routing algorithm may be implementation dependent, the preferred embodiment is implemented with a simple table look up approach.

For all downlink packets, the RRM performs the following functions:

1. It receives the LFI and the CoS information from the QoS manager, allocates appropriate physical layer resources for the CoS of this flow, and updates the routing table of the routing function with the address of the resource allocated i.e., <LFI, physical layer resource address>. In one embodiment, the routing tables reside in the RCD;

2. It receives the LFI and the CoS information for the new flow from the QoS manager allocates appropriate LAC/MAC resources to this flow, and updates the routing table of the routing function with the address of the resource allocated, ie., <LFI, LAC/MAC resource address>; and 3. It also initiates the notification to the user through an upper layer channel assignment message.

LAC/MAC layer 807 receives the LAC/MAC resource allocation information from the radio resource manger 805 and utilizes the routing table to route packets with a particular FLI tag to its allocated LAC resource 809.

Scheduler 813 schedules all the incoming RLP frames received from the LAC/MAC layer based upon "weights" assigned by wireless QoS agent 801. While LAC/MAC resources will be unshared, a physical layer resource 815 (e.g. a supplemental channel) may be shared by multiple user flows. Hence, the invention provides a necessary link layer scheduling algorithm at the MUX and QoS sub-layer which will schedule the RLP frames from multiple user flows to the same radio channel depending on the service priority. In one embodiment, the scheduling algorithm is based on simple priority queuing. In another embodiment, a more complicated weighted fair packet queuing algorithm is utilized. In the latter case, wireless QoS agent 801 adjusts the weights of the fair queuing algorithm based on the knowledge of the precedence and bandwidth allocation for the traffic classes scheduled.

Physical layer resource 815 routes the RLP packets to the physical layer resources based upon information received from radio resource manager 805. The scheduler and the routing function are added to the current definitions of third generation QoS and MUX sub layer.

One of the purposes of LFI is to route packets to the proper resources; hence, the LFI tag is removed before the packet is sent to the physical layer. The LFI removal block 817 removes the LFI tag from the RLP packets.

Flow monitoring element (FME) 811 monitors the QoS behavior that is meted to a particular flow. The parameters measured includes frame quality, FER, delay, jitter, etc of the link layer flow. Sample measurements are, either periodically or on request, sent to wireless QoS agent 801. Based on estimates, wireless QoS agent 801 makes a resource reassignment decision. Also, these QoS statistics and estimation enable wireless QoS agent 801 to provide a call admission decision to the RRM 805. Some of the QoS measurements from FME 811 may also be utilized by the higher layer protocols to achieve more robust performance over the wireless link.

B. QoS Framework Operation for Uplink Packets

Figure 9:
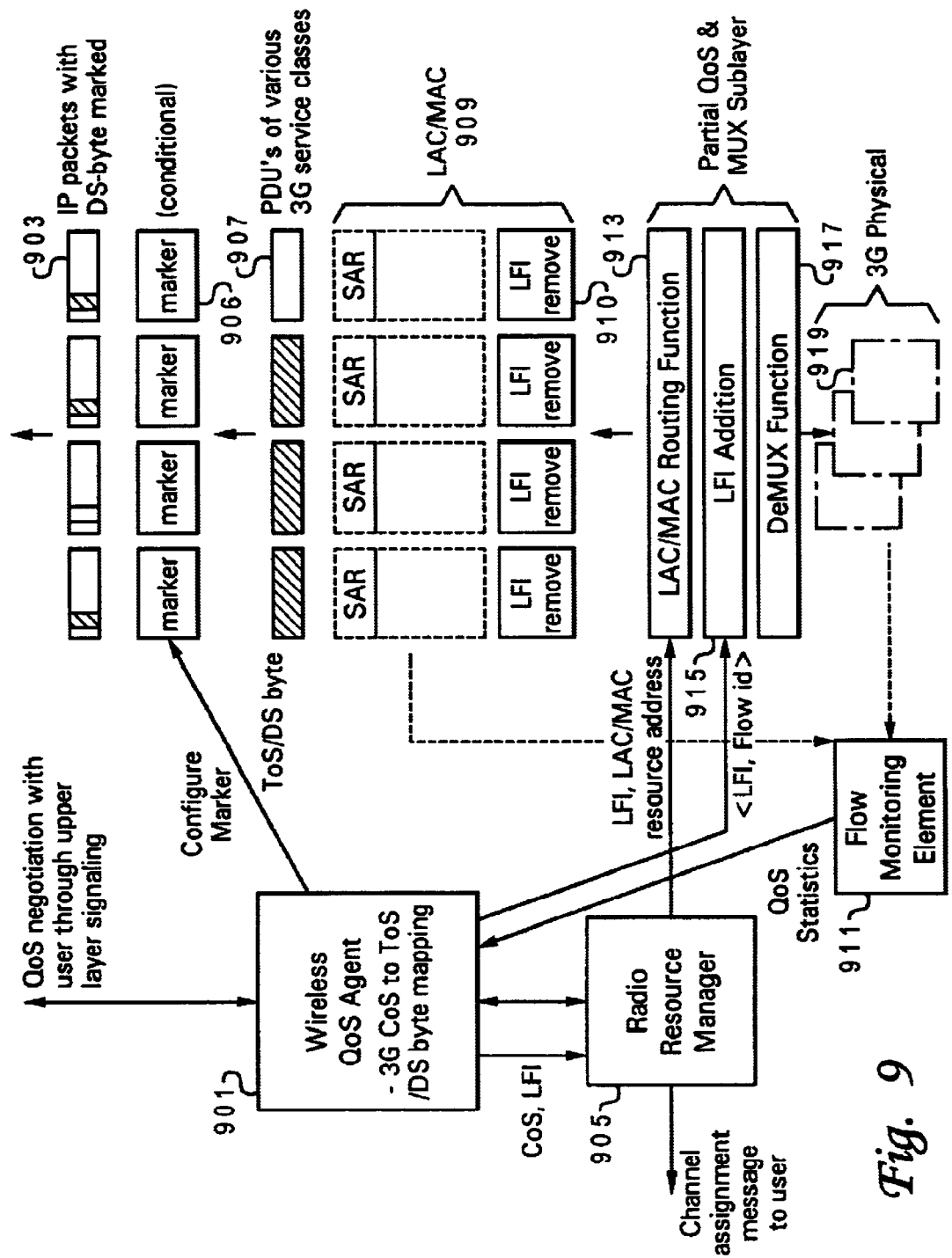
FIG. 9 depicts the QoS framework operation for uplink packets in accordance with the present invention.

FIG. 9 depicts the QoS framework operation for Uplink Packets. In the uplink direction, the physical layer packets from users sharing a channel have to be demultiplexed based on the flow ID. This is done by the demultiplexer function 917. If two users are sharing the same channel, this ID may be equivalent to the user ID which is carried in physical layer packet 919 which provides information to flow monitoring element 911. DeMUX function 917 is already part of the current Call division Multiple Access (CDMA2000) proposal. An LFI is added to each packet with the same flow ID at Add block 915. Different flow ID's will have different LFI's. The purpose of the LFI in the uplink direction is to ensure that each packet is routed to its appropriate LAC/MAC resource via LAC/MAC routing function 913. After the flows sharing a common channel are demultiplexed, individual flows are routed to LAC/MAC resource entities depending on the CoS of the flow. This resource assignment and routing table update is completed by RRM 905 in a similar fashion as described for a particular LFI. Accordingly, RRM 905 updates the routing table utilized by LAC/MAC routing function 913 of the LAC/MAC resources with physical resource address. The LFI tag, which is utilized for routing purpose, is removed in removal block 910 as soon as a packet enters LAC/MAC resource 909.

After the link layer packets are re-assembled at LAC/MAC resource 909 into upper layer packets, they have to be mapped into the IP service classes. There are two ways to implement this mapping. In one embodiment, a marker block 906 after LAC/MAC resource 909, which marks Protocol Data Unit (PDU) 907 of various third generation service classes is provided as the DS byte of the IP packet header 903. In this case, wireless QoS agent 901 does the inverse mapping from the third generation service class to the Diff-Serv DS byte and configures the marker accordingly. The reason for placing the marking function just above the link layer is that individual flow packets are already segregated at this point.

The user terminal may be capable of marking an IP packet with a specific ToS/DS byte for the type of service it demands. In that case, it will indicate to wireless QoS agent 801 that the ToS/DS byte has been marked. Wireless QoS agent 801 will turn off the marking functionality for this flow within the third generation network. Hence, the DS marker blocks 906 are shown as conditional in FIG. 4. The default IP service class is "best effort" if no service class information is provided by the user.

The QoS framework described in this invention permits the re-negotiation of resources during an on-going session. A user, unsatisfied by the received QoS may re-negotiate with the QoS manager for a better grade of service. A special upper layer signalling message is sent by the mobile to request for a QoS upgrade if possible. Otherwise, if the QoS estimation provided by the Flow Monitoring Element is such that the QoS manager decides that the expected service quality for the flow is not met, then it can initiate a dynamic channel re-allocation. Dynamic resource re-allocation are easily achieved in the proposed framework by routing table updates. Also, the separate routing functions for the LAC/MAC and the physical layer resources enable independent re-allocation of these two types of resources.

Since an LFI is already associated with the user flow, the QoS manager requests the RRM for a better QoS mechanism for the LFI. If resources are available, the RRM sends an acknowledgement message to the QoS manager, and also sends a resource reassignment message to the mobile. Once the mobile acknowledges this message, the RRM allocates the new resource and makes an update in the routing table entries for the LFI to reflect the new resource address.

The QoS manager monitors the service behavior of a flow belonging to a particular service class through the flow monitoring element. For example, if the expected FER for class 1 service is 10E-6 and the FER for a channel carrying class 1 traffic is constantly less than the target, then the QoS manager may initiate a dynamic service adaptation. It requests the RRM for an upgrade of the QoS mechanism for the LFI. If resources are available, the RRM allocates the new resource and acknowledges the QoS manager's request. The RRM then sends a message to the mobile informing about the new resource assignment. After it receives an acknowledgement from the mobile, the RRM makes the necessary routing table updates to reflect the new assignment. With separate routing functions, it is possible to re-allocate resources in a very flexible way to maintain a consistent grade of service.

In another illustration, the system may face a severe resource shortage. Then the QoS manager may poll the high bandwidth users to determine whether he/she is willing to sustain a temporary service degradation. If acknowledged by an user, the QoS manager will initiate a de-allocation of resources from the user flow through the RRM. This can be achieved again through a simple routing table update.

The various functionalities of the QoS agent of the present invention as described herein includes: (1) Mapping IP Flows to Wireless Service Requirements. The functionality of this block is to map the IP flow definitions to the wireless service requirements. For example the IP premium service may be mapped to BER 10E-9, low delay service class; (2) Parameter Computation. Depending on the service requirements, this functional block decides which type of channel resource and software modules (ARQ, power control etc) to allocate to the service. Also, it estimates some of the radio resource parameters (e.g., power control step size, Eb/No threshold etc); (3) Call Admission Controller. Due to the added dimensions of QoS definition (BER, delay, jitter etc. instead of only BER), call admission control for multimedia services is expected to be more complex and policy-based. The call admission controller will admit a new call depending on the current system-wide QoS and the radio resource requirements of the call; (4) System QoS Monitoring. Monitor QoS parameters affecting system performance, e.g., loading/interference in a CDMA cell, number of hand-off drops etc, and helps the CAC to make call admission decisions; (5) Radio Channel QoS Monitoring. QoS monitoring of individual radio channels is very important in order to provide dynamic link adaptation, a valuable asset to guarantee any type of QoS on the rapidly changing radio link. Two important parameters to be monitored are BER and delay (note that, error rates in individual radio channel is monitored in current wireless systems); and (6) Low Layer Flow Control. This is important due to the following reasons:

1. Dynamic, error-prone behavior of the air link;
2. Due to the addition of bursty Internet traffic (WWW), the air link traffic behavior is expected to undergo certain changes (tending to a more bursty nature). This may call for traffic shaping at the link (or even physical) layers. The present invention implements a delay-based scheme to achieve traffic shaping in IS-99 CDMA data-link is utilized; and
3. Since radio spectrum is a scarce resource, certain high bandwidth applications (e.g., compressed/uncompressed video stream) will be expected to "gracefully degrade" when faced with sudden resource constraint (typical scenario: when attempting hand-off to a heavily loaded cell). Degradation can be achieved through various flow control mechanisms, e.g., packet discard at link layer or transport layer, hierarchial coding etc.

The wireless QoS agent also provides two additional functionalities: (i) enhancement of the static RRM functions to provide dynamic capabilities, e.g., dynamic channel allocation & radio link adaptation; and (ii) various radio resource usage policy enforcement.

The link adaptation function requires some self-engineering techniques for fine-tuning various parameters used in radio resource control functions like power control functions like power control, hand-off management, ARQ, and also provide for dynamic allocation and re-allocation of channels (with the help of RRM) to utilize appropriate coding/interleaving techniques. The second function guarantees consistent usage of radio resources in face of frequent disconnection, hand-off and other mobility related events, using a set of predefined policies, e.g., degradation, channel reservation, call drop, courtesy hand-off & various "soft QoS" policies.

Figures 10A, 10B:
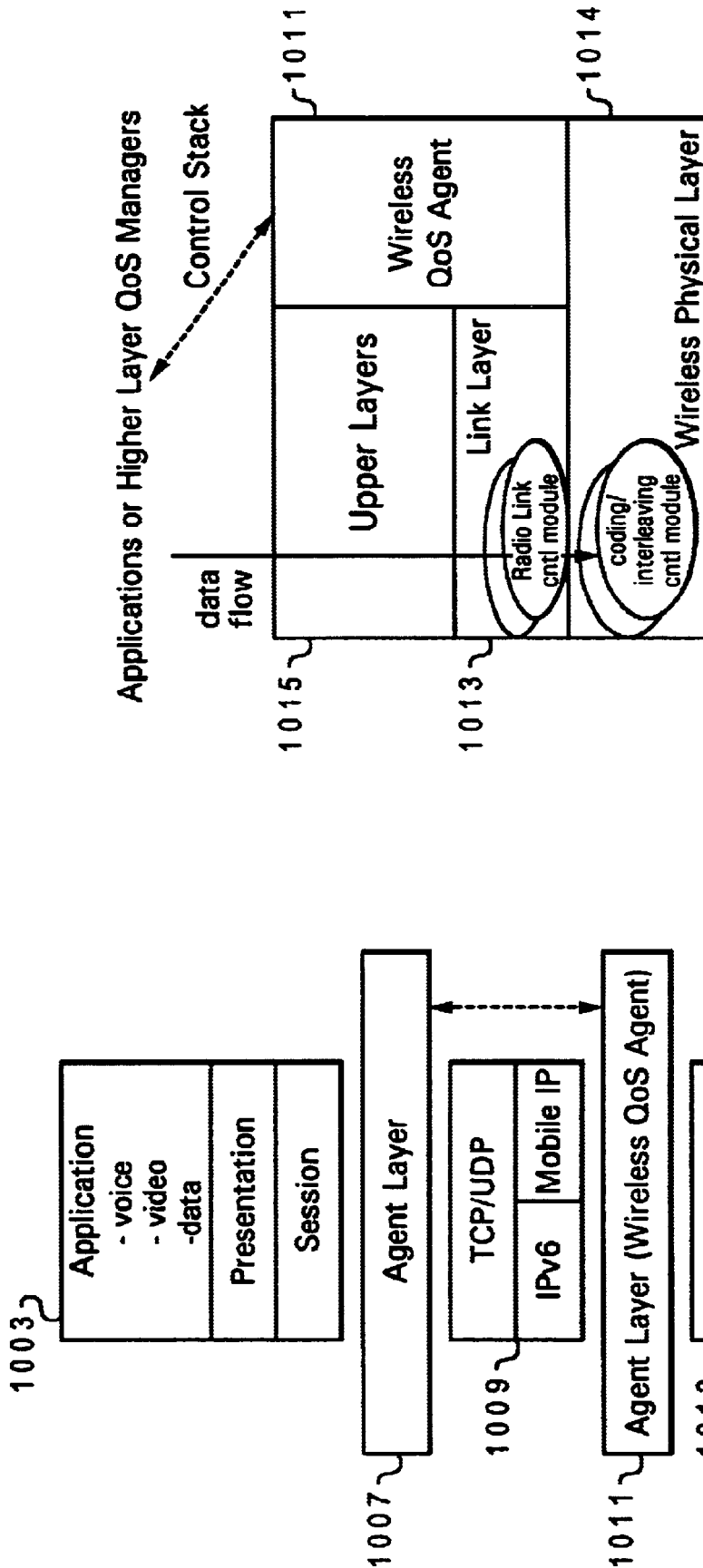
FIGS. 10a and 10b are an illustrative block diagram of the position of the QoS agent in the protocol architecture.

The preferred embodiment contemplates that the wireless QoS agent will be physically located within the BSC. FIG. 10A shows one possible position of the wireless Qos agent within the software/hardware architecture. The various protocol layers are shown, including the application, presentation and session 1003, TCP/IP, IPv6 and Mobile IP 1009, and wireless physical layer 1014. Almost all functionalities of the wireless agent (flow mapping, low layer flow control, link adaptability etc.) will be part of the wireless QoS agent layer 1011 shown above the radio link layer 1013. The QoS agent may need to exchange control information with higher layer agents 1007 (shown by dotted arrow). Also, in the preferred embodiment, the control overhead for QoS support should not have a detrimental effect on the data flow. Hence, another possibility is to make the QoS agent a separate kernel level module within the control stack as depicted in FIG. 10b. Wireless QoS agent 1011, is placed separately within the module adjacent to upper layers 1015, (radio) link layer 1013 and above wireless physical layer 1014.

Figure 11:
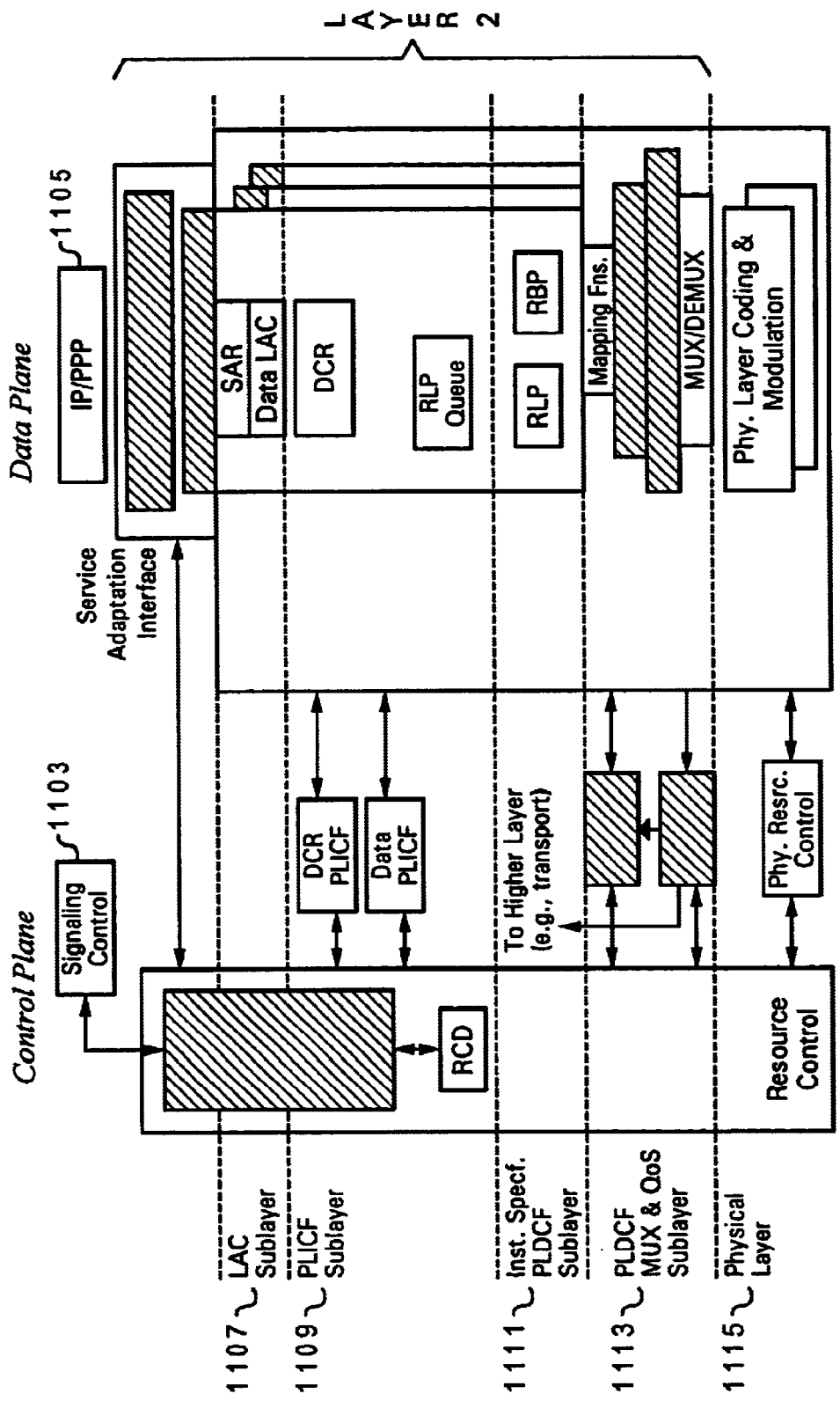
FIG. 11 depicts a third generation standard, QoS framework for base station in accordance with the present invention.

FIG. 11 shows the integration of the wireless QoS framework into the protocol stack currently begin developed under CDMA2000. The new or enhanced blocks are shown shaded in the figure. The wireless QoS agent functionality is now distributed in two separate blocks-the QoS mapping, adaptation and CAC block, which enhances the RRM functionality and is shown within the Resource Control module of CDMA2000, and the QoS control block. The QoS control block is enhanced with some of the functionality of the QoS manager., e.g. assignment of scheduling priorities, providing LFI to the QoS classifier block in the PLDCF MUX and QoS sub-layer. The LFI removal blocks, discussed earlier, are not shown explicitly in the Figure. The QoS classifier/routing block and the DS marker for uplink packets are placed in a block called service adaptation interface on top of LAC sub-layer 1107. Other protocol layers are clearly delineated with their respective functional blocks of the QoS IP system. They include PLICF sub-layer 1109, PLDCF sub-layer 1111, PLDCF MUX and QoS sub-layer 1113, and physical layer 1115. Additionally, signalling control 1103 exists on the control plane and Point-to-Point Protocol 1105 exists on the data plane.

It is also important to note that although the present invention has been described in the context of a fully functional method for wireless QoS agent for all-IP network, those skilled in the art will appreciate that various mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs-and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A wireless quality of service (QoS) agent for an Internet Protocol (IP) network, said QoS agent comprising:
   means for coupling said agent to said IP network, said coupling means including communication means for flow of information between said agent, a QoS manager of said IP network, and a network element;
   means for seamlessly extending QoS support for multimedia applications from a wireline EP medium to a wireless medium, said multimedia applications including voice, data, and multimedia video applications; and
   means for controlling QoS of said multimedia applications on said wireless medium to said IP network, said controlling means further comprising:
      means for mapping application QoS requirements to wireless QoS objectives;
      means for computing a wireless QoS parameter utilizing said objectives and an algorithm;
      means for determining a type of channel resource and modules to allocate to a service and to estimate a portion of a plurality of radio resource management (RRM) parameters, said determining means utilizing said wireless QoS parameter;
      means for controlling an external environment within (set boundaries assigned to a resource utilizing call admission control, wherein said controlling means admits a new call depending on a current systems QoS and a RRM parameter requirements of said call;
      means for monitoring a global QoS parameter affecting system performance, said performance including loading (interference) in a CDMA call, and a number of hand-off drops; and
      means for reporting a result of said monitoring means to a QoS agent.

2. The QoS agent of claim 1, wherein, said mapping means includes:
   means for mapping end-to-end network delay and jitter to radio link delay and jitter; and
   means for mapping application bit error rate to wireless frame error rate.

3. The wireless QoS agent of claim 1, wherein said agent is an autonomous body comprising means for providing local QoS guarantees within a wireless network.

4. A wireless quality of service (QoS) agent for an Internet Protocol (IP) network, said QoS agent comprising:
   means for coupling said agent to said IP network, said coupling means including communication means for flow of information between said agent, a QoS manager of said IP network, and a network element;
   means for seamlessly extending QoS support for multimedia applications from a wireline IP medium to a wireless medium, said multimedia applications including voice, data, and multimedia video; and
   means for controlling QoS of said multimedia applications on said wireless medium to said IP network, wherein said controlling means further includes:
      means for enhancing static radio resource manager (RRM) functions to provide dynamic capabilities;
      means for expanding radio resource usage policies; and
      means for enforcing radio resource usage policies.

5. The wireless QoS agent of claim 4, further comprising:
   means for monitoring radio channel QoS to provide dynamic link adaptation, wherein said monitoring means monitors a plurality of parameters including bit error rate (BER) and delay jitter; and
   means for controlling lower layer flow.

6. A system for providing seamless extension of IP QoS to air interface comprising:
   a wireless QoS agent coupled to an IP QoS system of an all-IP network; and
   means for controlling a behavior of a radio channel to ensure delivery of QoS to a wireless end user, wherein said means for controlling comprises means for mapping application QoS requirements to wireless QoS objectives;
   means for computing a wireless QoS parameter utilizing said objectives and an algorithm;
   means for determining a type of channel resource and modules to allocate to a service and to estimate a portion of a plurality of radio resource management (RRM) parameters, said determining means utilizing said wireless QoS parameter;
   means for controlling an external environment within a set bound for resource by call admission control, wherein said controlling means admits a new call depending on a current systems QoS and a RRM parameter requirements of said call;

means for monitoring a global QoS parameter affecting system performance, said performance including loading (interference) in a CDMA call, and a number of hand-off drops; and means for reporting a result of said monitoring means to a QoS agent.

7. The system of claim 6, further comprising:

means for mapping multimedia IP QoS requirements to radio link specific requirements;

means for providing dynamic link adaptability and a plurality of wireless QoS functionalities, including:

capabilities for optimizing channel behavior by managing power, coding and modulation;

lower layer flow control; and radio channel behavior monitoring.

8. A method for implementing wireless quality of service (QoS) for an Internet Protocol (IP) network, said method comprising the steps of:

coupling a wireless QoS agent to said IP network, said coupling means including communication means for flow of information between said QoS agent, a QoS manager of said IP network, and a network element;

seamlessly extending QoS support for multimedia applications from a wireline IP medium to a wireless medium, said multimedia applications including voice, data, and multimedia video applications; and controlling QoS of said multimedia applications on said wireless medium to said IP network, said controlling step further comprising:

mapping application QoS requirements to wireless QoS objectives;

computing a wireless QoS parameter utilizing said objectives and an algorithm;

determining a type of channel resource and modules to allocate to a service and to estimate a portion of a plurality of radio resource management (RRM) parameters, said determining step utilizing said wireless QoS parameter;

controlling an external environment within a set bound for resource by call admission control, wherein said controlling means admits a new call depending on a current systems QoS and a RRM parameter requirements of said call;

monitoring a global QoS parameter affecting system performance, said performance including loading (interference) in a CDMA call, and a number of hand-off drops; and reporting a result of said monitoring step to a QoS agent.

9. The method of claim 8, wherein, said mapping step includes the steps of:

mapping end-to-end network delay and jitter to radio link delay and jitter; and mapping application bit error rate to wireless frame error rate.

10. The method of claim 8, further comprising the steps of:

monitoring radio channel QoS to provide dynamic link adaptation, wherein said monitoring step monitors a plurality of parameters including bit error rate (BER) and delay jitter; and controlling lower layer flow.

11. A method for implementing wireless quality of service (QoS) for an Internet Protocol (IP) network, said method comprising the steps of:

coupling a wireless QoS agent to said IP network, said coupling means including communication means for flow of information between said QoS agent, a QoS manager of said IP network, and a network element;

seamlessly extending QoS support for multimedia applications from a wireline IP medium to a wireless medium, said multimedia applications including voice, data, and multimedia video applications; and controlling QoS of said multimedia applications on said wireless medium to said IP network, said controlling step further includes the steps of:

enhancing static radio resource manager (RRM) functions to provide dynamic capabilities;

expanding radio resource usage policies; and enforcing radio resource usage policies.

12. The method of claim 11, wherein said agent is an autonomous body which provides local QoS guarantees within a wireless network.

* * * * *